June 9, 1964    T. H. POCOCK ETAL    3,136,533
TRAILER BODY

Filed Dec. 1, 1960                     2 Sheets-Sheet 2

INVENTORS
T. H. POCOCK
J. W. PAWLEY

BY: Fetherstonhaugh & Co
ATTORNEYS

3,136,533
TRAILER BODY

Terrance H. Pocock and Jess William Pawley, London, Ontario, Canada, assignors to London Concrete Machinery Co. Limited, London, Ontario, Canada
Filed Dec. 1, 1960, Ser. No. 72,996
Claims priority, application Canada June 21, 1960
3 Claims. (Cl. 259—176)

This invention relates to means for supporting a mixer drum on a truck or trailer body and has principal application to the arrangement wherein the mixer drum is supported on a trailer, having rear wheels only, which is intended to be used in combination with a tractor.

By "vehicle" we include "truck," "tractor," a "trailer" and "tractor-trailer."

It is known to provide tractor-trailer combination wherein the trailer supports a mixer drum with means for rotating the drum. The drum axis is usually tilted relative to the horizontal but is approximately located in a vertical plane running longitudinally of the trailer. The drum is in present devices mounted wholly above the body. If the body in turn is of generally horizontal fore and aft arrangement to rest at its forward end on the trailer connection of the tractor, it will be seen that the body is above the tractor body and the drum in turn is wholly above the body. This arrangement requires sufficient clearance for the drum as to make passage under many standard ready mix concrete batching plants or other overhead obstacles impossible. The arrangement further provides a high centre of gravity for the trailer, rendering it dangerous on rough terrain or at substantial speeds. It might also be possible to use an alternative to the above construction, wherein the trailer body is as low or lower than the tractor body and a "goose-neck" connection from the front of the trailer body rises up and forwardly over the rear of the tractor body for connection thereto. In the latter arrangement, the trailer body may be made very low and the problems of high centre of gravity and of clearance thus overcome. However, the "goose-neck" arrangement and the disposition of the mixer drum entirely behind the tractor render the tractor-trailer combination long and unwieldy.

This invention provides a trailer body including spaced longitudinal beams for supporting the drum. The drum and the beam spacing are arranged so that a part of the lower circumference of the drum projects below and between the beams. Thus, the drum may be mounted on the trailer with lower clearance and lower centre of gravity relative to the trailer body than heretofore. With this lower arrangement the beams or rigid appurtenances thereof may be extended over the tractor body. Thus, the forward drum mounting may be located over the tractor body and a tractor-trailer combination, with the trailer so designed, is much more compact than with the "goose-neck" arrangement.

In drawings which illustrate an embodiment of the invention:

Figure 1:
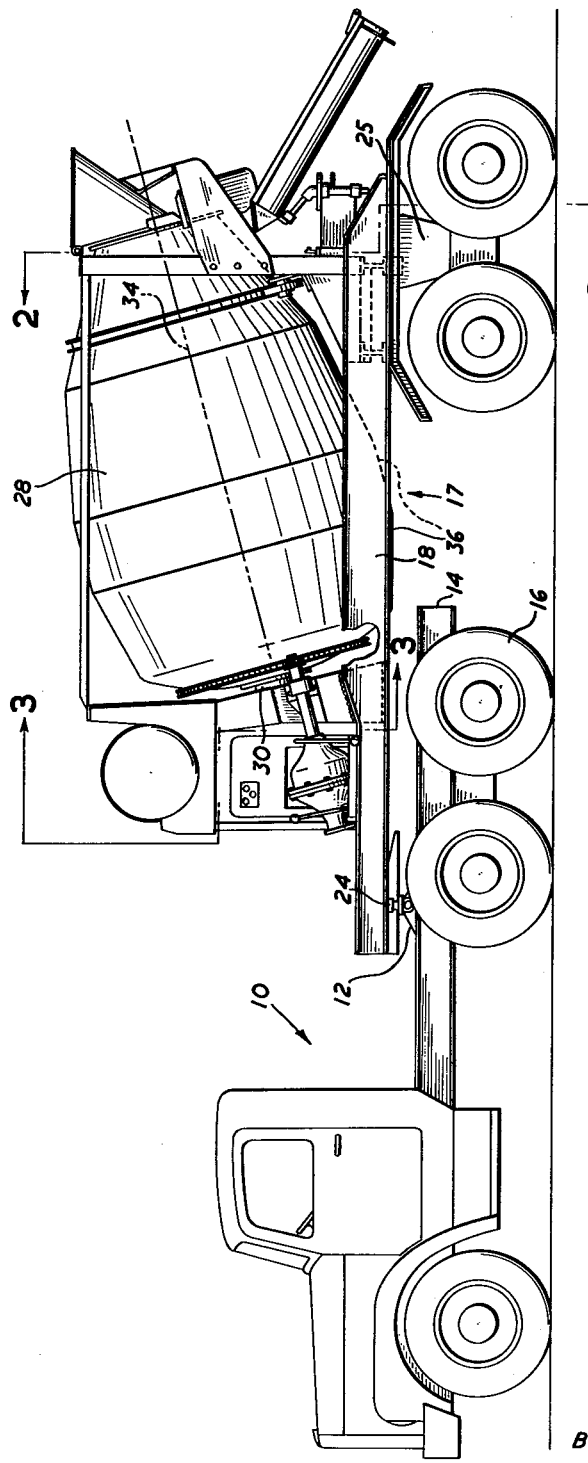
FIGURE 1 is a side view of a tractor connected to a trailer in accord with the invention.
Figure 2:
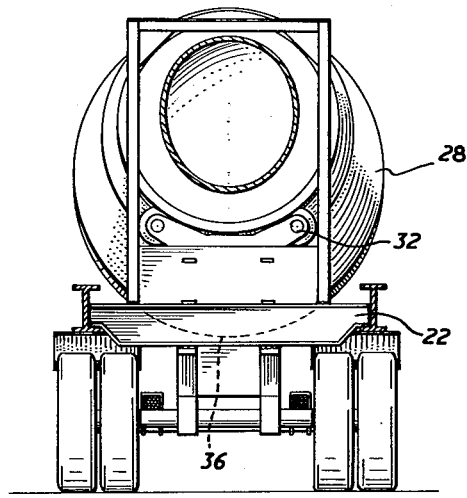
FIGURE 2 is a rear view of the elements shown in FIGURE 1.
Figure 3:
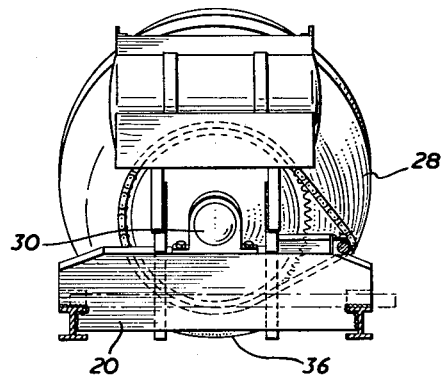
FIGURE 3 is a partial cross-section of the elements shown in FIGURE 1 taken along the line 3—3 of that figure.

In the drawings is shown a truck tractor 10 including a cab, front and rear wheels and a tractor body having a trailer connection 12 of any desired conventional design. The trailer connection 12 is located forwardly of the rearmost extremity 14 of the tractor 10 and preferably forward of the rear wheels 16 of the tractor.

The trailer comprises a body 17 having a pair of spaced longitudinal beams 18 forming the major longitudinal structural elements of the body 17. The beams 18 are connected near the front of the body 17 by a junction member 22. At the front of the trailer body 17 is tractor connection means 24 for attachment to the tractor which may be of any known construction cooperating with the trailer connector 12 on the tractor. At the rear of the trailer body 17 is provided means 25 for mounting the trailer on the trailer wheels 26.

A mixer drum 28 is provided, mounted on trailer body by forward and rearward mounting means 30 and 32. The tractor connection 24, the connection to the trailer wheels 25, and the forward and rearward mounting means 30 and 32 may be combined with the junction member 20 or 22 nearest thereto. Moreover, it will be understood that the particular mounting, rotation and dumping means for the mixer drum form no part of this invention and hence are not described.

The rotary axis 34 for the mixer drum is tilted as shown in the drawings but is approximately contained in a vertical plane extending longitudinally of the trailer.

In the drawings it will be seen that the line 36 representing the lowermost contour of the drum is lower at some locations than the uppermost part of the beams 18. The beams 18 are, in accordance with the invention, spaced to allow the lower portion of the mixer drum 28 to be arranged between them and the drum is so mounted. In this way the drum may have a lower clearance and the centre of gravity of drum and trailer is low contributing to its stability.

It will also be noted that beams 18 may, with this arrangement, be extended directly forward over the tractor body to the tractor-trailer connection, without the necessity of a "goose-neck" arrangement. Thus in the preferred embodiment the beams 18 run substantially from the tractor support to said rear wheel support. In this way the forward mounting 30 for the mixer drum 28 may be located over the tractor body and in front of the rearmost extremity thereof as thus contributing to the compactness of the arrangement in comparison to the "goose-neck" arrangement where all the drum mountings must be located entirely behind the tractor body.

The compactness is increased when the rearward mounting means 32 are located over the rear wheels 16 of the trailer.

In the embodiment of the invention now constructed the beams 18 are about twelves inches deep and it will be noted that the drum extends below them. The drum therefore is at least twelve inches lower than the upper surface of the beams 18. The beams 18 could be more or less than twelve inches deep and the drum could be more or less than twelves inches lower than the upper surface of the beams. The essential thing is that the drum be cradled between the beams to effectively lower it. In our claims we have claimed the cradling in a general way and have claimed it more specifically by means of specific drops.

What we claim as our invention is:

1. A semi trailer for use with a tractor truck having a fifth wheel load bearing trailer connector on the body thereof, said semi trailer comprising a body having a pair of spaced longitudinally extending beams with their longitudinal axes in a common plane, rear trailer wheels underlying the common plane of the axes of said beams adjacent the rear ends thereof, a fifth wheel trailer connection for said body under the common plane of the longitudinal axes of said beams, said fifth wheel connection being behind and adjacent the fronts of said beams, a mixer drum, support means for rotatably mounting said mixer drum on said body with its axis of rotation tilted and in a plane that extends longitudinally of said trailer body, said longitudinally extending beams being spaced apart to dispose a part of said mixer drum lower than the upper surface of said beams and between said beams.

2. A semi trailer as claimed in claim 1 in which said support means on said body for mounting said mixer drum on said body as aforesaid is adapted to support said mixer drum substantially above the common plane of the longitudinal axes of said beams and includes junction members that extend transversely across said body between said beams.

3. A semi trailer as claimed in claim 2 in which said beams are in parallel spaced apart relation.

References Cited in the file of this patent
UNITED STATES PATENTS

| | | |
|---|---|---|
| 845,435 | Roberts | Feb. 26, 1907 |
| 973,543 | Muller | Oct. 25, 1910 |
| 2,223,307 | Pachette et al. | Nov. 26, 1940 |
| 2,302,515 | Ball et al. | Nov. 17, 1942 |
| 2,308,901 | Viall et al. | Jan. 19, 1943 |
| 2,331,037 | McMillan | Oct. 5, 1943 |
| 2,398,549 | Murphy | Apr. 16, 1946 |
| 3,019,002 | Pritchard | Jan. 30, 1962 |
| 3,038,704 | Cook | June 12, 1962 |